United States Patent
Lee et al.

(10) Patent No.: US 9,482,899 B2
(45) Date of Patent: Nov. 1, 2016

(54) BACKLIGHT UNIT

(71) Applicant: Samsung Display Co., Ltd., Yongin, Gyeonggi-Do (KR)

(72) Inventors: Kang-Woo Lee, Seoul (KR); JoongHyun Kim, Asan-si (KR); Sung-Kyu Shim, Seoul (KR); Seong-Yong Hwang, Asan-si (KR); Dawoon Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 251 days.

(21) Appl. No.: 14/473,959

(22) Filed: Aug. 29, 2014

(65) Prior Publication Data

US 2015/0234234 A1    Aug. 20, 2015

(30) Foreign Application Priority Data

Feb. 18, 2014  (KR) .......................... 10-2014-0018588

(51) Int. Cl.
*G09F 13/04* (2006.01)
*G02F 1/1335* (2006.01)

(52) U.S. Cl.
CPC ... *G02F 1/133609* (2013.01); *G02F 1/133603* (2013.01); *G02F 1/133606* (2013.01); *G02F 2001/133607* (2013.01)

(58) Field of Classification Search
CPC .................. G02F 1/133603; G02F 1/133606; G02F 1/133609; G02F 1/133611; G02F 2001/133607; G02F 2001/133608
See application file for complete search history.

(56) References Cited

U.S. PATENT DOCUMENTS

| 7,056,005 | B2 * | 6/2006 | Lee | G02B 6/0036 362/23.15 |
|---|---|---|---|---|
| 2003/0189829 | A1 * | 10/2003 | Shimizu | F21K 9/13 362/240 |
| 2005/0036300 | A1 * | 2/2005 | Dowling | A01M 1/04 362/101 |
| 2006/0193148 | A1 * | 8/2006 | Bang | G02F 1/133603 362/607 |
| 2007/0147023 | A1 * | 6/2007 | Matsushita | G02F 1/133604 362/97.3 |
| 2007/0171651 | A1 | 7/2007 | Park et al. | |
| 2009/0147186 | A1 * | 6/2009 | Nakai | G02F 1/13471 349/74 |
| 2012/0201044 | A1 * | 8/2012 | Kim | G02B 6/009 362/602 |
| 2012/0212676 | A1 * | 8/2012 | Kuromizu | G02F 1/133308 348/725 |
| 2014/0369038 | A1 * | 12/2014 | Tischler | F21V 21/14 362/235 |
| 2014/0376208 | A1 * | 12/2014 | Shim | G02B 3/00 362/97.3 |

FOREIGN PATENT DOCUMENTS

| KR | 1020000067791 A | 11/2000 |
|---|---|---|
| KR | 1020050089286 A | 9/2005 |
| KR | 1020060118111 A | 11/2006 |

(Continued)

*Primary Examiner* — Ali Alavi
(74) *Attorney, Agent, or Firm* — Innovation Counsel LLP (57) ABSTRACT

Provided is a backlight unit including a printed circuit board, a light-emitting diode package, a diffusion plate, and a reflection sheet. The light-emitting diode package including a light-emitting part configured to generate a first light. The diffusion plate includes a first diffusion pattern provided on a first region corresponding to the light-emitting diode package and a second diffusion pattern provided on a second region to have a transmittance higher than that of the first diffusion pattern. The reflection sheet includes an absorption pigment configured to absorb a fraction of the first light with a specific wavelength and converting the first light to a second light, and the reflection sheet is configured to reflect the second light toward the first diffusion pattern. The backlight unit can have improved color coordinate uniformity.

20 Claims, 6 Drawing Sheets

(56) References Cited

FOREIGN PATENT DOCUMENTS

| | | |
|---|---|---|
| KR | 1020080103335 A | 11/2008 |
| KR | 1020100138064 A | 12/2010 |
| KR | 1020110094974 A | 8/2011 |
| KR | 1020110104398 A | 9/2011 |
| KR | 1020110104401 A | 9/2011 |
| KR | 1020120003273 A | 1/2012 |
| KR | 1020120003280 A | 1/2012 |
| KR | 1020120062239 A | 6/2012 |
| KR | 1020120065752 A | 6/2012 |
| KR | 1020120082860 A | 7/2012 |

* cited by examiner

BACKLIGHT UNIT

CROSS-REFERENCE TO RELATED APPLICATIONS

This U.S. non-provisional patent application claims priority under 35 U.S.C. §119 to Korean Patent Application No. 10-2014-0018588, filed on Feb. 18, 2014, in the Korean Intellectual Property Office, the entire contents of which are hereby incorporated by reference.

BACKGROUND

Example embodiments of the inventive concept relate to a backlight unit, and in particular, to a direct-type backlight unit.

In general, a liquid crystal display device may include a liquid crystal display panel displaying images, a backlight unit providing light to the liquid crystal display panel, and a bottom chassis containing the backlight unit.

The backlight unit, according to a position of a light source, can be classified into two types: edge-type and direct-type. For the edge-type backlight unit, the light source is provided below the display panel. In general, a light-emitting diode is used as the light source. When compared with the conventional case that CCFL is used as the light source, the use of the light-emitting diode has technical advantages, such as faster response time and an environment-friendly solid device without a heavy metal (e.g., mercury).

SUMMARY

Example embodiments of the inventive concept provide a backlight unit with improved color coordinate uniformity.

According to example embodiments of the inventive concept, a backlight unit may include a printed circuit board, a light-emitting diode package, a diffusion plate, and a reflection sheet. The light-emitting diode package is provided on and electrically connected to the printed circuit board, the light-emitting diode package including a light-emitting part configured to generate a first light. The diffusion plate is provided on the light-emitting diode package to include first and second diffusion patterns provided on first and second regions, respectively.

The second diffusion pattern may have a transmittance higher than that of the first diffusion pattern. The first region may be provided at a region corresponding to the light-emitting diode package, and the second region may be provided to enclose the first region. The reflection sheet may further be provided to include a body part and an absorption pigment. The body part may be provided at a region corresponding to the first region and may be interposed between the printed circuit board and the light-emitting diode package. The absorption pigment may be provided on the body part and may be configured to absorb a fraction of the first light with a specific wavelength and convert the first light to a second light. The reflection sheet may be configured to reflect the second light toward the first diffusion pattern.

In example embodiments, the reflection sheet may be provided on a top surface of the printed circuit board.

In example embodiments, the first diffusion pattern may include a plurality of diffusion protrusions that are provided to have a first density, and the second diffusion pattern may include a plurality of diffusion protrusions that are provided to have a second density lower than the first density.

In example embodiments, the plurality of diffusion protrusions may be formed of a material, whose transmittance is higher for a long wavelength fraction of a visible light than for a short wavelength fraction of the visible light.

In example embodiments, the absorption pigment may be formed of a material absorbing the long wavelength fraction of the first light more than the short wavelength fraction of the first light.

In example embodiments, the reflection sheet may be locally provided on a region of the printed circuit board corresponding to the first region.

In example embodiments, the reflection sheet may have a content of the absorption pigment ranging from 0.001 wt % to 1 wt %.

In example embodiments, the reflection sheet may further include a pigment region shaped like a dot pattern, and the absorption pigment may be disposed on a region of the reflection sheet corresponding to the pigment region.

In example embodiments, the printed circuit board may be shaped like a bar extending along a specific direction. The light-emitting diode package may include a plurality of light-emitting diode packages arranged in a row along the specific direction of the printed circuit board.

In example embodiments, the printed circuit board may include a connection socket, and the reflection sheet may include a terminal hole extending to the connection socket. The light-emitting diode package may include a connection terminal electrically connected to the connection socket via the terminal hole.

In example embodiments, the light-emitting diode package may include a lens part covering the light-emitting part, and a top surface of the light-emitting diode package may be curved to have an upward convex profile, thereby configured to guide the first light toward a side surface thereof. A slope of a tangent line to the top surface of the light-emitting diode package decreases from a center thereof to a side surface thereof.

In example embodiments, the backlight unit may further include a reflection plate configured to reflect the first light toward the second diffusion pattern.

In example embodiments, the backlight unit may further include a bottom chassis. The reflection plate may include a reflection part configured to reflect the first light toward the second diffusion pattern and an opening extending to a bottom portion of the bottom chassis, and the printed circuit board may be disposed on the bottom portion to which the opening extends.

According to example embodiments of the inventive concept, a backlight unit may include a printed circuit board, a light-emitting diode package, a diffusion plate, and a reflection plate. The light-emitting diode package is provided on and electrically connected to the printed circuit board, the light-emitting diode package including a light-emitting part configured to generate a first light. The diffusion plate is provided on the light-emitting diode package to include first and second diffusion patterns provided on first and second regions, respectively. The second diffusion pattern may have a transmittance higher than that of the first diffusion pattern, the first region may be provided at a region corresponding to the light-emitting diode package, and the second region may be provided to enclose the first region. The reflection plate may further be provided in the second region. The reflection plate may include an absorption pigment configured to absorbing a fraction of the first light with a specific wavelength and converting the first light to a second light. The reflection plate may be configured to reflect the second light toward the second diffusion pattern.

In example embodiments, the first diffusion pattern may include a plurality of diffusion protrusions that are provided to have a first density, and the second diffusion pattern may include a plurality of diffusion protrusions that are provided to have a second density lower than the first density.

In example embodiments, the plurality of diffusion protrusions may be formed of a material, whose transmittance is higher for a long wavelength fraction of a visible light than for a short wavelength fraction of the visible light.

In example embodiments, the absorption pigment may be formed of a material absorbing the short wavelength fraction of the first light more than the long wavelength fraction of the first light.

In example embodiments, the reflection plate further may include a pigment region that is positioned in the second region and is shaped like a dot pattern, and the absorption pigment may be disposed on a region of the reflection plate corresponding to the pigment region.

In example embodiments, the printed circuit board may be shaped like a bar extending along a specific direction. The light-emitting diode package may include a plurality of light-emitting diode packages arranged in a row along the specific direction of the printed circuit board.

In example embodiments, the light-emitting diode package may include a lens part covering the light-emitting part. A top surface of the light-emitting diode package may be curved to have an upward convex profile and may be configured to guide the first light toward a side surface thereof. A slope of a tangent line to the top surface of the light-emitting diode package may decrease from a center thereof to a side surface thereof.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
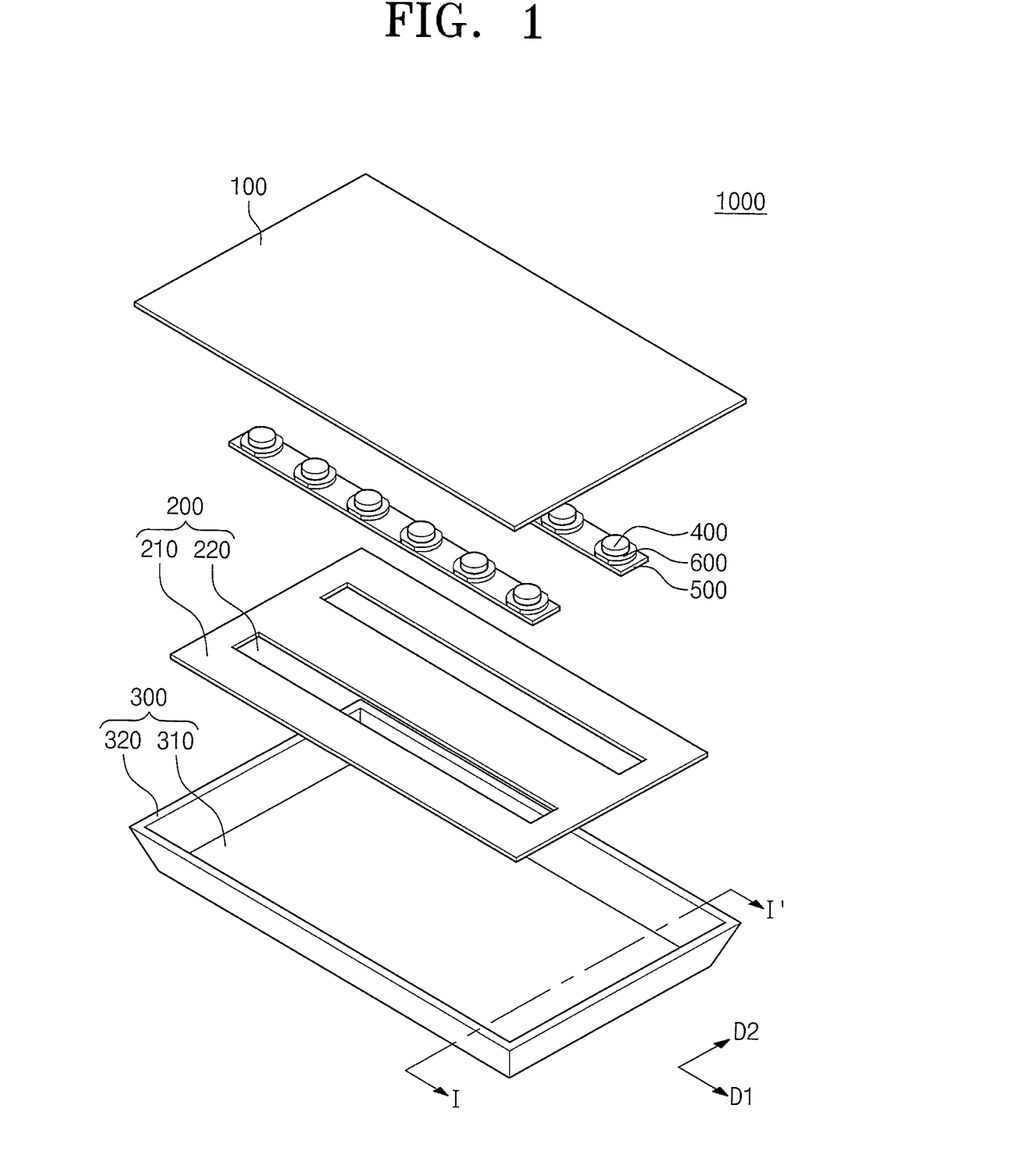
FIG. 1 is an exploded perspective view illustrating a backlight unit according to example embodiments of the inventive concept.

FIG. 1 is an exploded perspective view illustrating a backlight unit 1000 according to example embodiments of the inventive concept.

Referring to FIG. 1, the backlight unit 1000 may include a light-emitting diode package 400 generating light, a printed circuit board 500 provided with components for driving the light-emitting diode package 400, and a bottom chassis 300 containing the light-emitting diode package 400 and the printed circuit board 500.

The bottom chassis 300 may include a bottom portion 310, on which the light-emitting diode package 400 and the printed circuit board 500 are loaded, and a sidewall 320 extending upward from the bottom portion 310. In example embodiments, the bottom portion 310 may have a pair of sides parallel to a first direction D1 and another pair of side parallel to a second direction D2 or perpendicular to the first direction D1, thereby having a rectangular shape. The sidewall 320 may extend from the two pairs of sides. In example embodiments, the bottom chassis 300 may be formed of a metallic material.

A shape of the printed circuit board 500 may be variously changed. In example embodiments, the printed circuit board 500 may be shaped like a bar extending along the first direction D1. Further, the number of the printed circuit board 500 provided on the bottom portion 310 may be two or more. For example, two printed circuit boards 500 may be provided on the bottom portion 310 and be spaced apart from each other in the second direction D2.

The light-emitting diode package 400 may be disposed on the printed circuit board 500. In certain embodiments, a plurality of the light-emitting diode packages 400 may be provided spaced apart from each other in the first direction D1, on the printed circuit board 500. The light-emitting diode package 400 may be electrically connected to the printed circuit board 500, and its light-emitting operation may be controlled by signals from the printed circuit board 500.

The backlight unit 1000 may further include a diffusion plate 100, a reflection plate 200, and a reflection sheet 600.

The reflection plate 200 may be provided on the bottom portion 310 and may include a reflection part 210 and an opening 220. The reflection part 210 may reflect light transmitted from the light-emitting diode package 400 toward the diffusion plate 100, and this makes it possible to improve luminous efficiency of the backlight unit 1000. The opening 220 may be provided at a position corresponding to the printed circuit board 500 to extend to and expose partially the bottom portion 310. The printed circuit board 500 may be provided on the bottom portion 310 exposed by the opening 220. The reflection part 210 may be formed of, for example, polyethylene terephthalate (PET) or polycarbonate (PC).

The diffusion plate 100 may be provided on the light-emitting diode package 400 to face the light-emitting diode package 400. The diffusion plate 100 may be shaped like a rectangular plate. The diffusion plate 100 may be configured to diffuse light transmitted from the light-emitting diode package 400 and thereby improve brightness uniformity of the backlight unit 1000.

The reflection sheet 600 may be provided on a top surface of the printed circuit board 500. For example, the reflection sheet 600 may be disposed between the printed circuit board 500 and the light-emitting diode package 400. The reflection sheet 600 may reflect light transmitted from the light-emitting diode package 400 toward the diffusion plate 100. The reflection sheet 600 will be described in more detail with reference to FIGS. 3 through 5.

Figure 2:
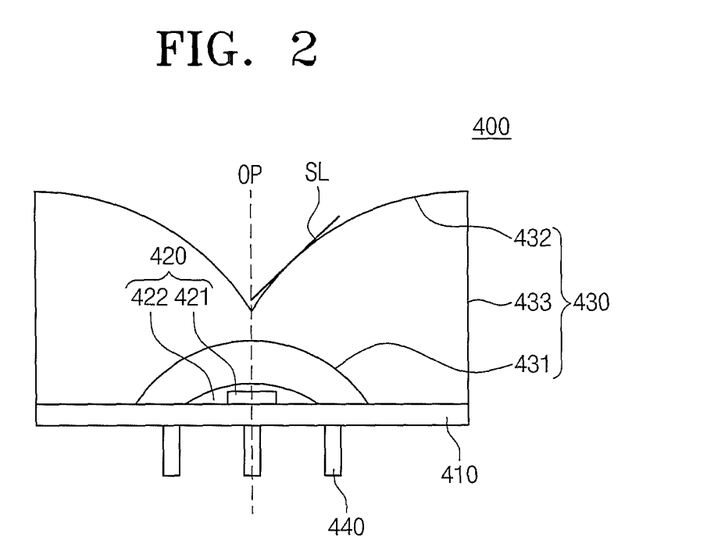
FIG. 2 is a sectional view illustrating the light-emitting diode package of FIG. 1.

FIG. 2 is a sectional view illustrating the light-emitting diode package of FIG. 1.

Referring to FIG. 2, the light-emitting diode package 400 may include a base substrate 410 serving as a base of the light-emitting diode package 400, a light-emitting part 420 generating light, a lens part 430 configured to guide the light toward its side surface, and a connection terminal 440 electrically connecting the light-emitting part 420 to the printed circuit board 500 of FIG. 1.

The light-emitting part 420 may include a light-emitting diode 421 and a phosphor 422. The light-emitting diode 421 may be configured to generated, for example, blue light and may be provided in the form of a chip. The phosphor 422 may be coated on the light-emitting diode 421 to cover the light-emitting diode 421. A fraction of the blue light may be absorbed by the phosphor 422, and in this case, electric charges in the phosphor 422 may be excited and be used to generate, for example, yellow light. The remaining fraction of the blue light, which is not absorbed by the phosphor 422, may pass through the phosphor 422. The blue and yellow lights emitted from the phosphor 422 may be mixed into a white light. The white light may be emitted to the outside of the light-emitting diode package 400 through the lens part 430.

The lens part 430 may be provided to cover the light-emitting part 420 and may have an internal surface 431, a top surface 432, and a side surface 433. The internal surface 431 may have an upward concave profile, when viewed in a sectional view, and have a circular shape, when viewed in a plan view. The internal surface 431 may be foamed to define a containing space providing room for the light-emitting part 420, between the same and the top surface of the base substrate 410.

The top surface 432 may have a rotational symmetry with respect to a virtual line OP, which passes through a center of the light-emitting diode package 400 and is normal to the top surface of the base substrate 410. The section of the top surface 432 may be upward convex, and a slope SL of a tangent line to the top surface 432 may decrease from a center of the lens part 430 toward a side edge of the lens part 430. Although not illustrated in the drawings, the vertical section of the top surface 432 may be variously changed. For example, when viewed in a vertical sectional view, the top surface 432 may be linearly slanted at a constant angle to the virtual line OP. The side surface 433 may extend from an edge of the top surface 432 toward the base substrate 410.

Light generated in the light-emitting part 420 may be incident into the lens part 430 through the internal surface 431, be guided by the top surface 432, and then, be emitted to the lens part 430 through the side surface 433. Since the light is emitted to the outside through the side surface of the lens part 430, it is possible to increase distribution in brightness of the light and improve brightness uniformity of the backlight unit 1000.

The connection terminal 440 may extend from the base substrate 410 toward the printed circuit board 500. In certain embodiments, three connection terminals 440 may be provided below the base substrate 410.

Figure 3:
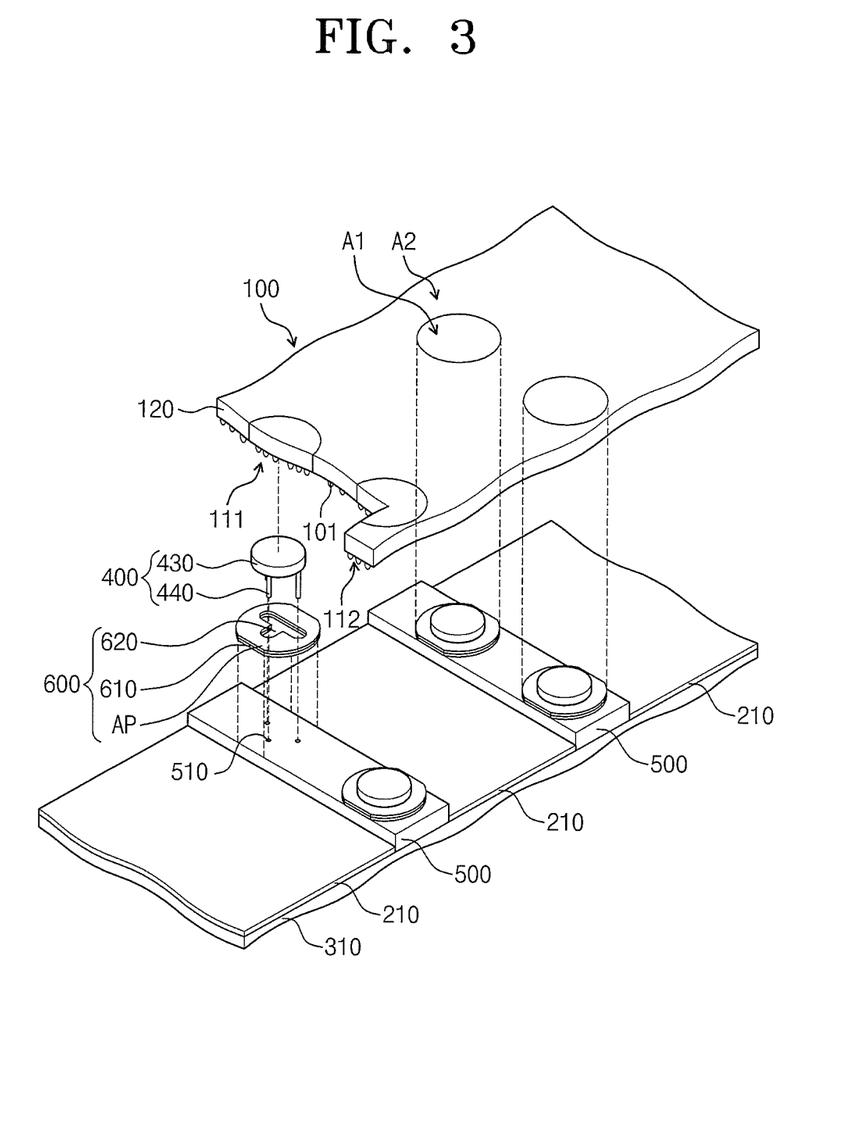
FIG. 3 is an enlarged perspective view illustrating a portion of the backlight unit shown in FIG. 1.
Figure 4:
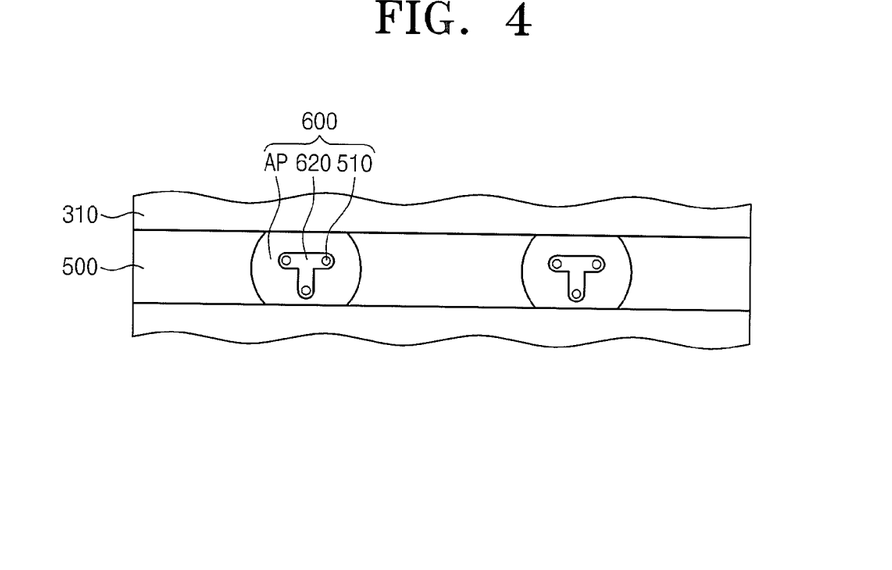
FIG. 4 is an enlarged plan view illustrating a portion of the reflection sheet shown in FIG. 1.

FIG. 3 is an enlarged perspective view illustrating a portion of the backlight unit shown in FIG. 1, and FIG. 4 is an enlarged plan view illustrating a portion of the reflection sheet shown in FIG. 1.

Referring to FIGS. 3 and 4, the diffusion plate 100 may include a first region A1 and a second region A2 enclosing the first region A1. The first region A1 may be provided at a position corresponding to the light-emitting diode package 400. When viewed in a plan view, the first region A1 may have the same shape as that of the lens part 430 (for example, a circular shape).

The light-emitting diode 400 may not be provided on the second region A2. For example, the first region A1 may be disposed more adjacent to the light-emitting diode package 400, compared with the second region A2, and thus, an amount of light incident into the first region A1 may be greater than that into the second region A2.

The diffusion plate 100 may include a diffusion pattern for diffusing an incident light. The diffusion pattern may include a first diffusion pattern 111 provided on the first region A1 and a second diffusion pattern 112 provided on the second region A2.

Each of the first and second diffusion patterns 111 and 112 may include a plurality of diffusion protrusions 101. The diffusion plate 100 may include a base plate 120 having a bottom surface facing the light-emitting diode package 400 and a top surface opposite the bottom surface. The plurality of diffusion protrusions 101 may protrude from the bottom surface. However, example embodiments of the inventive concept may not be limited thereto, and for example, the plurality of diffusion protrusions 101 may be provided on the top surface to protrude upward from the top surface.

The plurality of diffusion protrusions 101 may have a variety of shape or structure. For example, each of the diffusion protrusions 101 may be shaped like a semi-sphere protruding from the bottom surface toward the light-emitting diode package 400. The diffusion protrusions 101 may be formed of, for example, $TiO_2$. The diffusion protrusions 101 may be configured to have semi-permeability. For example, the diffusion protrusions 101 may be configured to reflect and refract a fraction of an incident light and allow the remaining fraction to pass therethrough. As the result of the change in the propagation path of the incident light (e.g., reflection or refraction), the incident light may be diffused.

A density of the diffusion protrusions 101 on the first diffusion pattern 111 may be different from that on the second diffusion pattern 112. For example, the diffusion protrusions 101 may be provided to have a first density on the first diffusion pattern 111 and a second density, which is smaller than the first density, on the second diffusion pattern 112. Accordingly, the second diffusion pattern 112 may have reflectance lower than that of the first diffusion pattern 111 and have transmittance higher than that of the first diffusion pattern 111.

Since the first diffusion pattern 111 is provided closer to the light-emitting diode package 400 than the second diffusion pattern 112 is, an amount of light incident into the first diffusion pattern 111 may be greater than that into the second diffusion pattern 112. However, since the first diffusion pattern 111 has reflection and refraction efficiencies higher than the second diffusion pattern 112 and the second diffusion pattern 112 has a higher transmittance than that of the first diffusion pattern 111, the incident light may pass through the first and second regions A1 and A2 in a uniform light amount. This makes it possible to improve brightness uniformity of the backlight unit 1000.

The transmittance of the diffusion protrusions 101 may be dependent on a wavelength of the incident light. For example, a short-wavelength fraction of a visible light may be more absorbed by the diffusion protrusions 101 than a long-wavelength fraction. Thus, the long-wavelength fraction may pass more through the diffusion protrusions 101 than the short-wavelength fraction. This may lead to an increase in color coordinate of light emitted from the diffusion protrusions 101, compared to that of light incident into the diffusion protrusions 101, and thus, the light emitted from the diffusion protrusions 101 may be yellowish, compared to the light incident therein. Here, the color coordinate may be a position of a color that is represented in the CIE coordinate system with coordinates Cx and Cy. Further, the increase in color coordinate means that at least one of the coordinates Cx and Cy increases in such a way that the color coordinate is moved toward blue color on the CIE coordinate system. By contrast, a decrease in color coordinate means that at least one of the coordinates Cx and Cy decreases in such a way that the color coordinate is moved toward red color on the CIE coordinate system. The increase in color coordinate of the light passing through the diffusion protrusions 101 may vary depending on the density of the diffusion protrusions 101. For example, an increase in the density of the diffusion protrusions 101 may lead to an increase in transmittance of the long wavelength fraction, rather than the short wavelength fraction, and this allows for an increase in the color coordinate of the light passing through the diffusion protrusions 101.

A variation in the color coordinate of the light passing through the first diffusion pattern 111 (hereinafter, referred as to a first color coordinate variation $\Delta C1$) may be greater than that passing through the second diffusion pattern 112 (hereinafter, referred as to a second color coordinate variation $\Delta C2$), because the first density is higher than the second density. Accordingly, the light passing through the first diffusion pattern 111 may be more yellowish, compared with that passing through the second diffusion pattern 112.

The reflection sheet 600 may be provided at a position corresponding to the first region A1. The reflection sheet 600 may be provided in the form of, for example, a circular film. The reflection sheet 600 may include an attachment surface facing the printed circuit board 500. The attachment surface may be coated with an adhesive material, and the reflection sheet 600 may be attached to the top surface of the printed circuit board 500 by the adhesive material.

The reflection sheet 600 may include a body part 610 reflecting an incident light, an absorption pigment AP provided in the body part 610, and a terminal hole 620 defined by the body part 610. The printed circuit board 500 may include a connection socket 510, in which the connection terminal 440 can be inserted. When the reflection sheet 600 is attached to the printed circuit board 500, the connection socket 510 may be exposed by the terminal hole 620 which extends to the connection socket 510. The connection terminal 440 may be inserted into the connection socket 510 exposed by the terminal hole 620.

Of the incident light, a fraction with a specific wavelength may be absorbed by the absorption pigment AP. In example embodiments, the absorption pigment AP may be configured to selectively absorb the long wavelength fraction of the incident light. Accordingly, the color coordinate of the light incident into the absorption pigment AP may be decreased by a third color coordinate variation ΔC3, and thus, light incident into the reflection sheet 600 may become somewhat bluish and be reflected toward the diffusion plate 100 by the body part 610.

The absorption pigment AP may be provided on the reflection sheet 600 without a positional limitation. For example, in example embodiments, the absorption pigment AP may be provided on the whole top surface of the body part 610.

Figure 5:
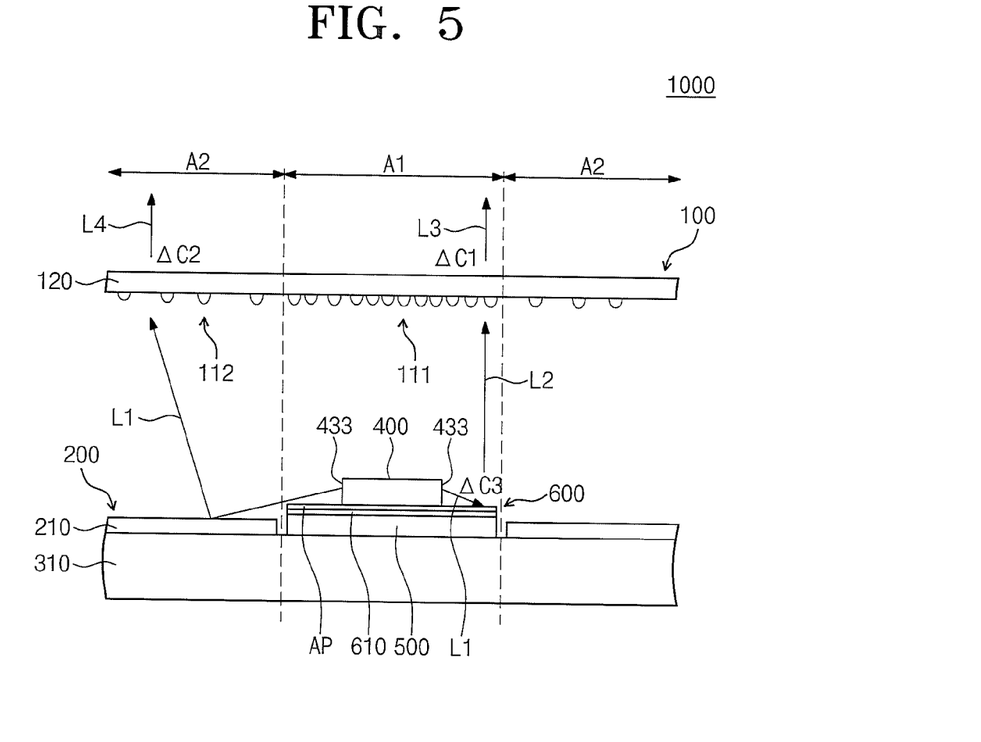
FIG. 5 is a sectional view illustrating the backlight unit shown in FIG. 2.

FIG. 5 is a sectional view illustrating the backlight unit shown in FIG. 2.

Referring to FIG. 5, the light-emitting diode package 400 may emit a first light L1 of white color through the side surface 433.

The first light L1 emitted from the light-emitting diode package 400 may be incident into the absorption pigment AP of the reflection sheet 600. The absorption pigment AP may absorb a long wavelength fraction of the first light L1 more than a short wavelength of the first light L1 and convert the first light L1 into a second light L2. Here, a color coordinate of the second light L2 may be decreased from that of the first light L1 by the third color coordinate variation ΔC3, and thus, the second light L2 may be more bluish, compared with the first light L1.

The second light L2 may be reflected by the body part 610 and then be incident into the first diffusion pattern 111. The first diffusion pattern 111 may absorb a short wavelength fraction of the second light L2 and convert the second light L2 into a third light L3. Here, a color coordinate of the third light L3 may be increased from that of the second light L2 by the first color coordinate variation ΔC1, and thus, the third light L3 may be more yellowish, compared with the second light L2. The third light L3 may pass through the diffusion plate 100 and be upward emitted from the top surface of the diffusion plate 100.

A fraction of the first light L1 may be incident into the reflection part 210 of the reflection plate 200 and then be reflected by the reflection part 210 to be incident into the second diffusion pattern 112.

The second diffusion pattern 112 may absorb a short wavelength fraction of the first light L1 more than the long wavelength fraction of the first light L1 and convert the first light L1 into a fourth light L4. Here, a color coordinate of the fourth light L4 may be increased from that of the first light L1 by the second color coordinate variation ΔC2, and thus, the fourth light L4 may be more yellowish, compared with the first light L1. The fourth light L4 may pass through the diffusion plate 100 and be upward emitted from the top surface of the diffusion plate 100.

Since the first color coordinate variation ΔC1 is greater than the second color coordinate variation ΔC2, there may be a difference in color coordinate between the third and fourth lights L3 and L4.

However, the color coordinate of the second light L2 may be decreased from the color coordinate of the first light L1 by the third color coordinate variation ΔC3 owing to the absorption pigment AP and then be increased by the first color coordinate variation ΔC1 owing to the first diffusion pattern 111. Accordingly, a difference in the color coordinate between the first and third lights L1 and L3 may correspond to a sum of the first and third color coordinate variations ΔC1 and ΔC3. A difference in the color coordinate between the first and fourth lights L1 and L4 may correspond to the second color coordinate variation ΔC2. In this case, the absorption pigment AP may be configured in such a way that the sum of the first and third color coordinate variations ΔC1 and ΔC3 is approximately the same as the second color coordinate variation ΔC2, and this makes it possible to reduce a variation in the color coordinate between the third and fourth lights L3 and L4. Accordingly, a difference in color between the third and fourth lights L3 and L4 can be reduced, and thus, the backlight unit 1000 can have improved color coordinate uniformity.

Figure 6:
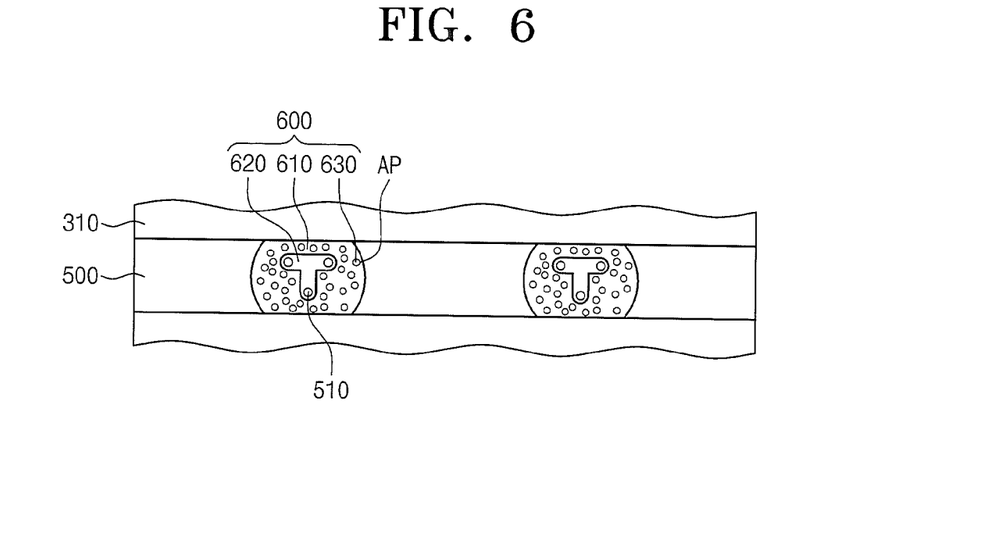
FIG. 6 is an enlarged plan view illustrating a portion of a reflection sheet according to other example embodiments of the inventive concept.

An example in which the absorption pigment AP is provided on the whole top surface of the body part 610 was described, but, in certain embodiments, the absorption pigment AP may be locally provided on a portion of the body part 610. In example embodiments, as shown in FIG. 6, the absorption pigment AP may be provided on a pigment region 630, which is defined on the top surface of the body part 610 and may defined as a dot pattern. The larger the pigment region 630, the more the amount of the absorption pigment AP to be provided on the body part 610. The more the amount of the absorption pigment AP, the more the absorption of the short wavelength fraction of the first light L1 shown in FIG. 5, and thus, it is possible to control the third color coordinate variation ΔC3 of FIG. 5. This mean that by adjusting the area of the pigment region 630, it is possible to control the color and the color coordinate of the third light L3.

Figure 7:
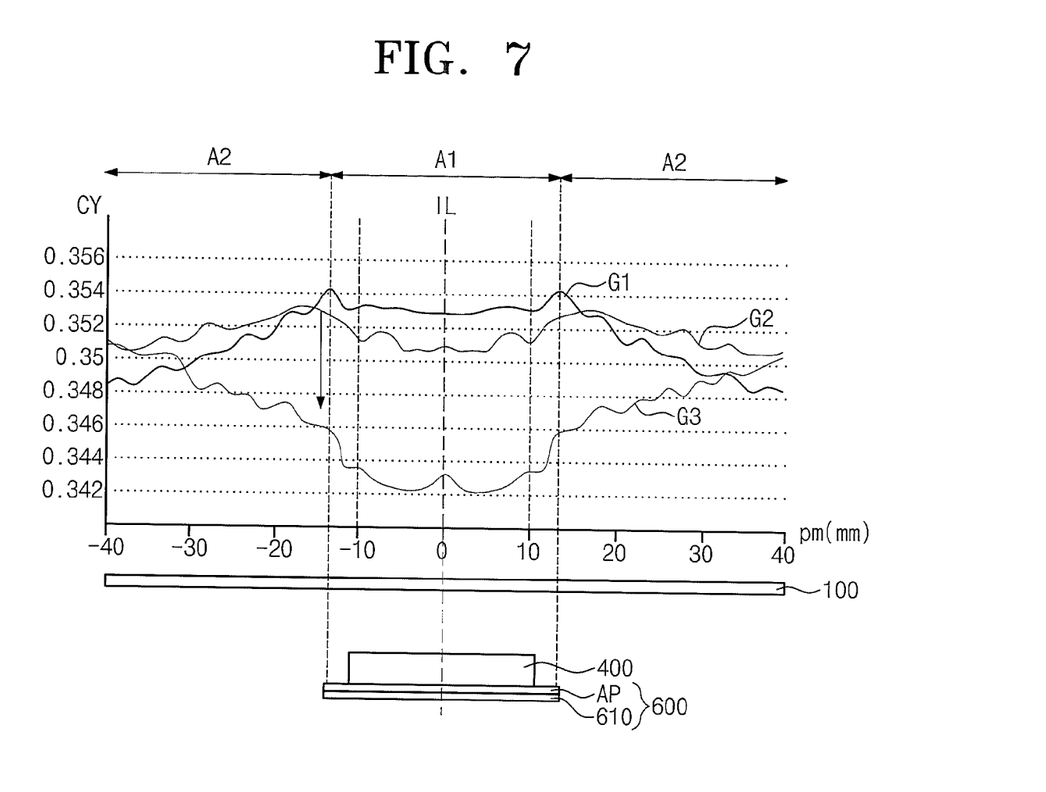
FIG. 7 is a graph showing color coordinates of light measured on a diffusion plate.

FIG. 7 is a graph showing color coordinates of light measured on a diffusion plate.

In FIG. 7, the x-axis represents a distance from a virtual line, which passes through a center of the reflection sheet 600 in a thickness direction, to a measurement position pm, and the y-axis represents a color coordinate Cy measured at the measurement position pm. A first curve G1 shows the color coordinate measured when the absorption pigment AP is not provided on the reflection sheet 600, and a second curve G2 shows the color coordinate measured when the reflection sheet 600 contains 0.1 wt % absorption pigment AP. The first and second curves G1 and G2 were obtained from lights emitted from the top surface of the diffusion plate 100.

In the first region A1, the first curve G1 was higher than the second curve G2. Further, a difference in the color coordinate between the first and second regions A1 and A2 was smaller in the second curve G2 than in the first curve G1.

In other words, this result shows that the presence of about 0.1 wt % absorption pigment AP provided on the reflection sheet 600 can contribute to reduce the difference in the color coordinate between the first and second regions A1 and A2 and thereby to improve the color coordinate uniformity of the backlight unit 1000.

A third curve G3 shows the color coordinate measured when the reflection sheet 600 contains 1 wt % absorption pigment AP. As shown in the third curve G3, in the case where the absorption pigment AP was excessively provided, the difference in the color coordinate between the first and second regions A1 and A2 was increased. This shows that a content of the absorption pigment AP may be needed to be below 1 wt %. In example embodiments, the content of the absorption pigment AP may range from 0.01 wt % to 1 wt %.

Figure 8:
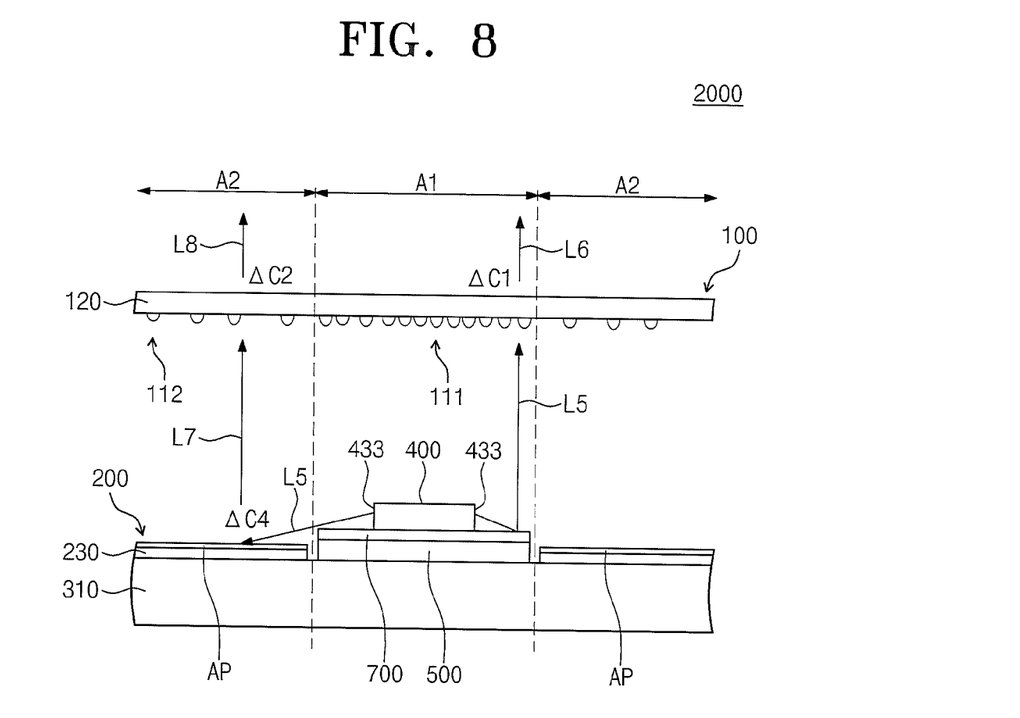
FIG. 8 is a sectional view illustrating a backlight unit according to still other example embodiments of the inventive concept.

FIG. 8 is a sectional view illustrating a backlight unit according to still other example embodiments of the inventive concept.

Referring to FIG. 8, a backlight unit 2000 may include the reflection plate 200 with a reflection part 230 and a reflection sheet 700. Except for some differences associated with the reflection part 230 and the reflection sheet 700, the backlight unit 2000 may be configured to have substantially the same features as those of the backlight unit 1000 described with reference to FIGS. 1 through 4, and for convenience in description, the aforesaid technical features may be omitted below.

The reflection part 230 may include the absorption pigment AP. In the present embodiment, the absorption pigment AP may be configured to absorb a short wavelength fraction of light transmitted from the light-emitting diode package 400 more than a long wavelength fraction of light transmitted from the light-emitting diode package 400. Owing to such absorption of the absorption pigment AP, the color coordinate of the light incident into the reflection part 230 may be increased by a fourth color coordinate variation $\Delta C4$, and thus, the light incident into the reflection part 230 may become somewhat yellowish.

The absorption pigment AP may be provided on the reflection part 230 without a positional limitation. For example, in example embodiments, the absorption pigment AP may be provided on the whole top surface of the reflection part 230.

In certain embodiments, unlike the reflection sheet 600 of FIG. 1 to FIG. 4, the absorption pigment AP may not be provided on the reflection sheet 700. Accordingly, the reflection sheet 700 may reflect light incident therein toward the diffusion plate 100, without a change of color coordinate.

The light-emitting diode package 400 may emit a fifth light L5 of white color through the side surface 433. The fifth light L5 may be incident into the reflection sheet 700 and be reflected by the reflection sheet 700 to be incident into the first diffusion pattern 111.

The first diffusion pattern 111 may absorb a short wavelength fraction of the fifth light L5 more than a long wavelength fraction of the fifth light L5 to convert the fifth light L5 into a sixth light L6. Accordingly, a color coordinate of the sixth light L6 may be increased from that of the fifth light L5 by the first color coordinate variation $\Delta C1$, and thus, the sixth light L6 may have a yellowish color, compared with that of the fifth light L5. The sixth light L6 may pass through the diffusion plate 100 and be upward emitted from the top surface of the diffusion plate 100.

The fifth light L5 emitted from the light-emitting diode package 400 may be incident into the reflection part 230. The absorption pigment AP may absorb the short wavelength fraction of the fifth light L5 more than a long wavelength fraction of the fifth light L5 to convert the fifth light L5 into a seventh light L7. Accordingly, a color coordinate of the seventh light L7 may be increased from that of the fifth light L5 by the fourth color coordinate variation $\Delta C4$, and thus, the seventh light L7 may have a yellowish color, compared with that of the fifth light L5.

The seventh light L7 may be reflected by the reflection part 230 and be incident into the second diffusion pattern 112. The second diffusion pattern 112 may absorb a short wavelength fraction of the seventh light L7 more than a long wavelength fraction of the seventh light L7 to convert the seventh light L7 into an eighth light L8. Accordingly, a color coordinate of the eighth light L8 may be increased from that of the seventh light L7 by the second color coordinate variation C2, and thus, the eighth light L8 may have a yellowish color, compared with that of the seventh light L2.

The eighth light L8 may pass through the diffusion plate 100 and be upward emitted from the top surface of the diffusion plate 100.

Since the first color coordinate variation $\Delta C1$ is greater than the second color coordinate variation $\Delta C2$, there may be a difference in the color coordinate between the sixth and eighth lights L6 and L8.

However, the color coordinate of the seventh light L7 may be increased from the color coordinate of the fifth light L5 by the fourth color coordinate variation $\Delta C4$ owing to the absorption pigment AP and then be further increased by the second color coordinate variation $\Delta C2$ owing to the second diffusion pattern 112. Accordingly, a difference in color coordinate between the fifth and eighth lights L5 and L8 may correspond to a sum of the second and fourth color coordinate variations $\Delta C2$ and $\Delta C4$. A difference in the color coordinate between the fifth and sixth lights L5 and L6 may correspond to the first color coordinate variation $\Delta C1$. In this case, the absorption pigment AP may be configured in such a way that the sum of the second and fourth color coordinate variations $\Delta C2$ and $\Delta C4$ is approximately the same as the first color coordinate variation $\Delta C1$, and this makes it possible to reduce a variation in the color coordinate between the sixth and eighth lights L6 and L8. Accordingly, a difference in color between the sixth and eighth lights L6 and L8 can be reduced, and thus, the backlight unit 2000 can have improved color coordinate uniformity.

Figure 9:
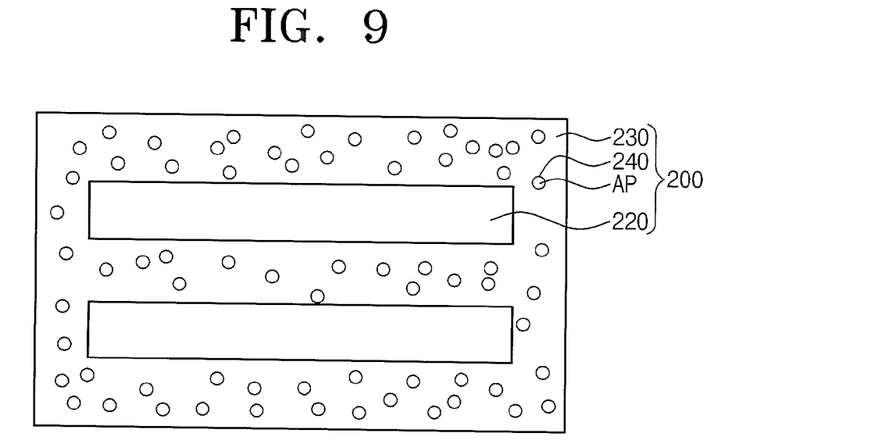
FIG. 9 is an enlarged plan view illustrating a portion of a reflection plate, according to still other example embodiments of the inventive concept.

An example in which the absorption pigment AP is provided on the whole top surface of the reflection part 230 was described, but, in certain embodiments, the absorption pigment AP may be locally provided on a portion of the reflection part 230. In example embodiments, as shown in FIG. 9, the absorption pigment AP may be provided on a pigment region 240, which is defined on the top surface of the reflection part 230 and may defined as a dot pattern. The larger the pigment region 240, the more the amount of the absorption pigment AP to be provided on the reflection part 230. The more the amount of the absorption pigment AP, the more the absorption of the short wavelength fraction of the fifth lights L5 shown in FIG. 8, and thus, it is possible to control the fourth color coordinate variation $\Delta C4$ of FIG. 8. This mean that by adjusting the area of the pigment region 240, it is possible to control the color and the color coordinate of the eighth light L8.

According to example embodiments of the inventive concept, a backlight unit may include a reflection sheet configured to convert a fraction of a first light having a specific wavelength range into a second light and reflect the second light toward a first diffusion pattern. This makes it possible to reduce non-uniformity of color coordinate, which may result from a difference in pattern density between the first and second diffusion patterns. Accordingly, the backlight unit can have improved color coordinate uniformity.

According to other example embodiments of the inventive concept, a backlight unit may include a reflection plate configured to convert a fraction of a first light having a specific wavelength range into a second light and reflect the second light toward the second diffusion pattern. This makes it possible to reduce non-uniformity of color coordinate, which may result from a difference in pattern density between the first and second diffusion patterns. Accordingly, the backlight unit can provide light with improved color coordinate uniformity.

While example embodiments of the inventive concepts have been particularly shown and described, it will be understood by one of ordinary skill in the art that variations in form and detail may be made therein without departing from the spirit and scope of the attached claims.

What is claimed is:

1. A backlight unit, comprising:
   a printed circuit board;
   a light-emitting diode package provided on and electrically connected to the printed circuit board, the light-emitting diode package including a light-emitting part configured to generate a first light;
   a diffusion plate provided on the light-emitting diode package to include first and second diffusion patterns provided on first and second regions, respectively, wherein the second diffusion pattern has a transmittance higher than that of the first diffusion pattern, the first region is provided at a region corresponding to the light-emitting diode package, and the second region is provided to enclose the first region; and
   a reflection sheet including a body part and an absorption pigment, wherein the body part is provided at a region corresponding to the first region and is interposed between the printed circuit board and the light-emitting diode package, the absorption pigment is provided on the body part and is configured to absorb a fraction of the first light with a specific wavelength and convert the first light to a second light, and the reflection sheet is configured to reflect the second light toward the first diffusion pattern.

2. The backlight unit of claim 1, wherein the reflection sheet is provided on a top surface of the printed circuit board.

3. The backlight unit of claim 2, wherein the first diffusion pattern comprises a plurality of diffusion protrusions that are provided to have a first density, and
   the second diffusion pattern comprises a plurality of diffusion protrusions that are provided to have a second density lower than the first density.

4. The backlight unit of claim 2, wherein the plurality of diffusion protrusions are formed of a material, whose transmittance is higher for a long wavelength fraction of a visible light than for a short wavelength fraction of the visible light.

5. The backlight unit of claim 4, wherein the absorption pigment is foamed of a material absorbing the long wavelength fraction of the first light more than the short wavelength fraction of the first light.

6. The backlight unit of claim 2, wherein the absorption pigment is locally provided on a region of the printed circuit board corresponding to the first region.

7. The backlight unit of claim 6, wherein the reflection sheet has a content of the absorption pigment ranging from 0.01 wt % to 1 wt %.

8. The backlight unit of claim 6, wherein the reflection sheet further comprises a pigment region shaped like a dot pattern, and
   the absorption pigment is disposed on a region of the reflection sheet corresponding to the pigment region.

9. The backlight unit of claim 1, wherein the printed circuit board is shaped like a bar extending along a specific direction, and
   the light-emitting diode package comprises a plurality of light-emitting diode packages arranged in a row along the specific direction of the printed circuit board.

10. The backlight unit of claim 1, wherein the printed circuit board comprises a connection socket, and
    the reflection sheet comprises a terminal hole extending to the connection socket,
    wherein the light-emitting diode package comprises a connection terminal electrically connected to the connection socket via the terminal hole.

11. The backlight unit of claim 1, wherein the light-emitting diode package comprises a lens part covering the light-emitting part, and
    a top surface of the lens part is curved to have an upward convex profile, thereby configured to guide the first light toward a side surface thereof,
    wherein a slope of a tangent line to the top surface of the lens part decreases from a center thereof to a side surface thereof.

12. The backlight unit of claim 1, further comprising a reflection plate configured to reflect the first light toward the second diffusion pattern.

13. The backlight unit of claim 12, further comprising a bottom chassis,
    wherein the reflection plate comprises a reflection part configured to reflect the first light toward the second diffusion pattern and an opening extending to a bottom portion of the bottom chassis, and
    the printed circuit board is disposed on the bottom portion to which the opening extends.

14. The backlight unit of claim 1, wherein the light-emitting diode package comprises a lens part covering the light-emitting part, and
    a top surface of the light-emitting diode package is curved to have an upward convex profile, thereby configured to guide the first light toward a side surface thereof,
    wherein a slope of a tangent line to the top surface of the light-emitting diode package decreases from a center thereof to a side surface thereof.

15. A backlight unit, comprising:
    a printed circuit board;
    a light-emitting diode package provided on and electrically connected to the printed circuit board, the light-emitting diode package including a light-emitting part configured to generate a first light;
    a diffusion plate provided on the light-emitting diode package to include first and second diffusion patterns provided on first and second regions, respectively, wherein the second diffusion pattern has a transmittance higher than that of the first diffusion pattern, the first region is provided at a region corresponding to the light-emitting diode package, and the second region is provided to enclose the first region; and
    a reflection plate provided in the second region, the reflection plate including an absorption pigment configured to absorb a fraction of the first light with a specific wavelength and converting the first light to a second light, and the reflection plate is configured to reflect the second light toward the second diffusion pattern.

16. The backlight unit of claim 15, wherein the first diffusion pattern comprises a plurality of diffusion protrusions that are provided to have a first density, and
    the second diffusion pattern comprises a plurality of diffusion protrusions that are provided to have a second density lower than the first density.

17. The backlight unit of claim 16, wherein the plurality of diffusion protrusions are formed of a material, whose transmittance is higher for a long wavelength fraction of a visible light than for a short wavelength fraction of the visible light.

18. The backlight unit of claim 17, wherein the absorption pigment is formed of a material absorbing the short wavelength fraction of the first light more than the long wavelength fraction of the first light.

19. The backlight unit of claim 15, wherein the printed circuit board is shaped like a bar extending along a specific direction, and the light-emitting diode package comprises a plurality of light-emitting diode packages arranged in a row along the specific direction of the printed circuit board.

20. The backlight unit of claim 15, wherein the reflection plate further comprises a pigment region that is positioned in the second region and is shaped like a dot pattern, and the absorption pigment is disposed on a region of the reflection plate corresponding to the pigment region.

* * * * *